United States Patent Office 3,258,973
Patented July 5, 1966

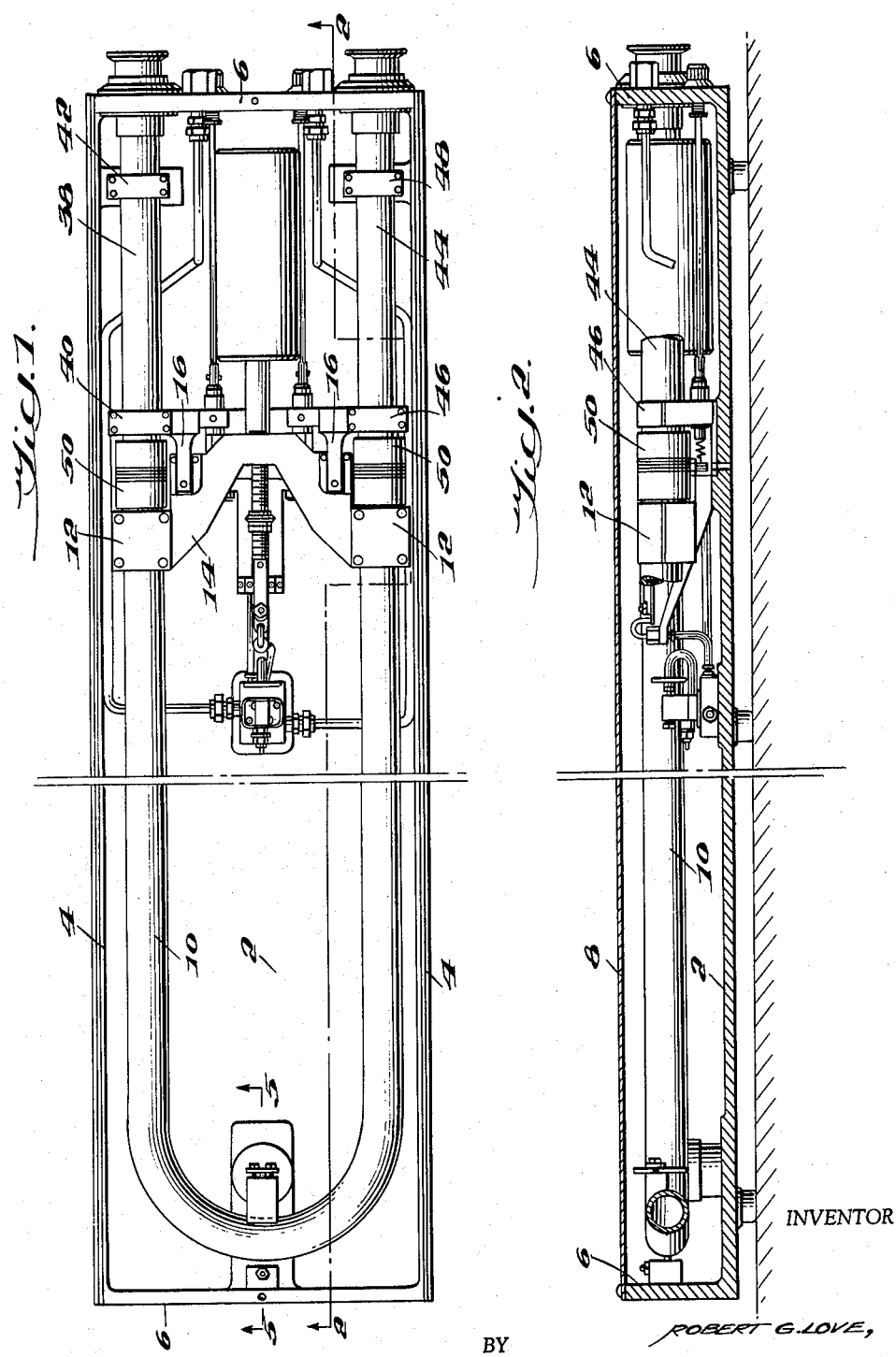

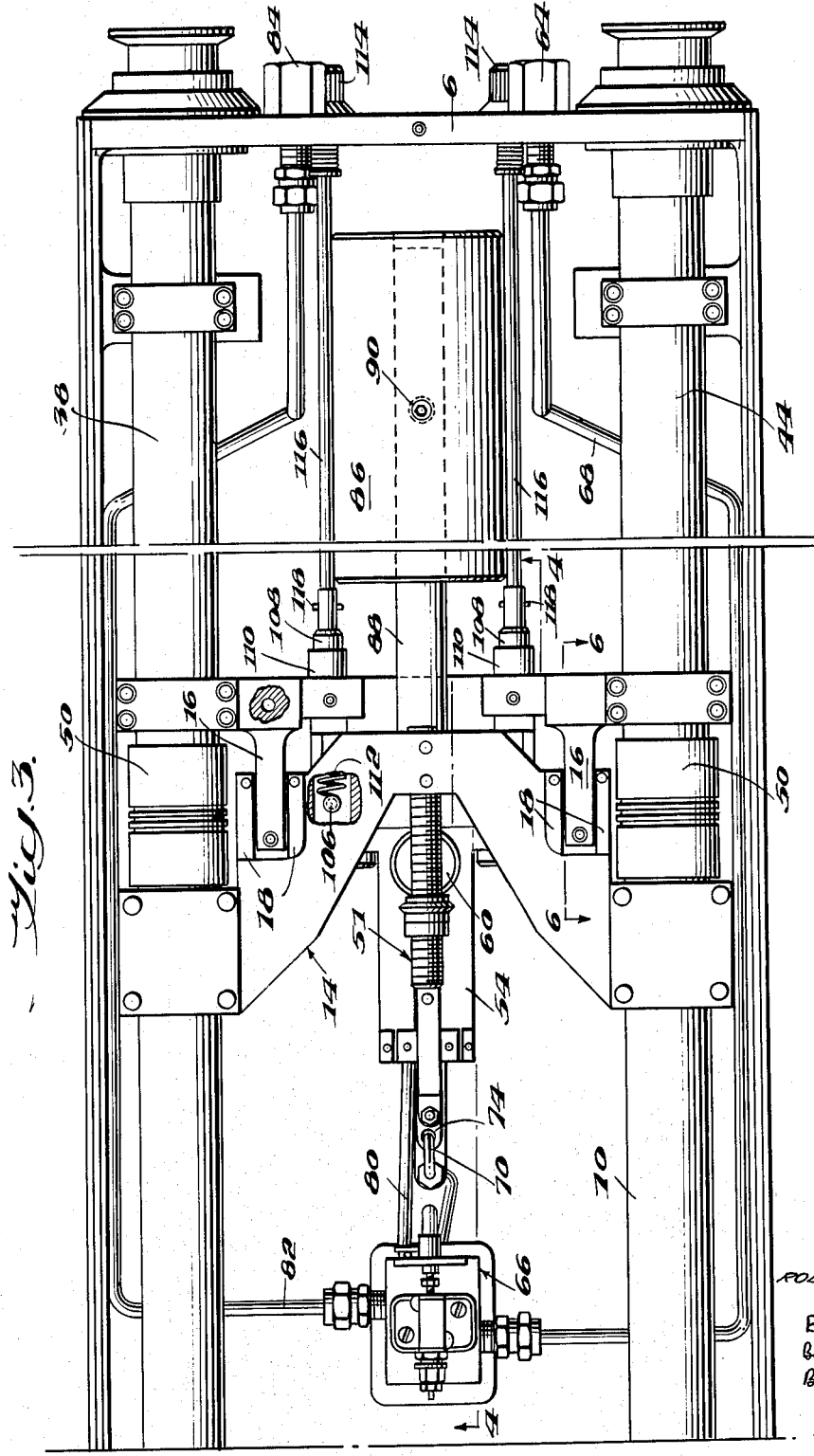

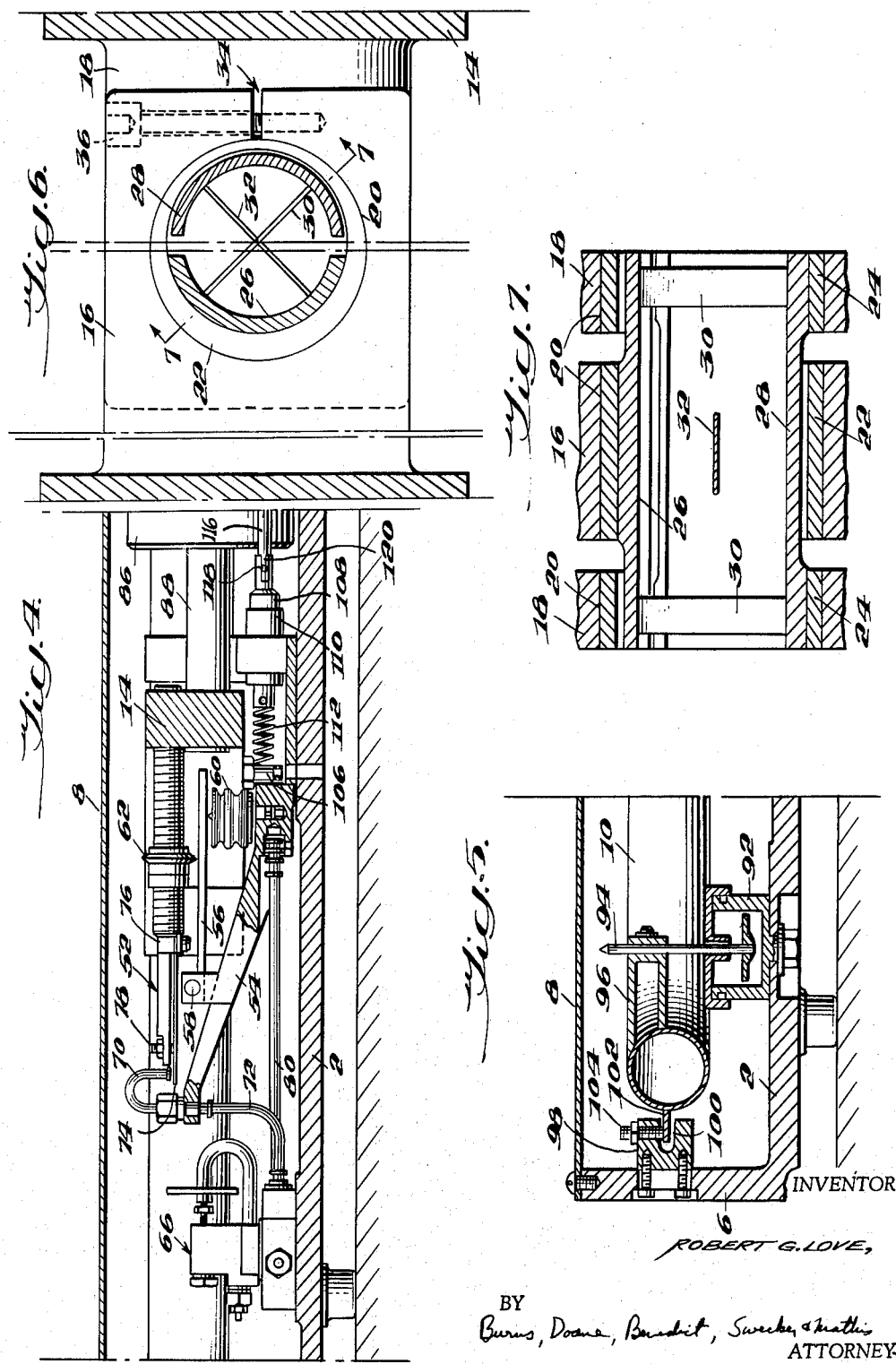

3,258,973
DENSITY METER
Robert G. Love, Duncan, Okla., assignor to Halliburton Company, Duncan, Okla., a corporation of Delaware
Filed Dec. 6, 1963, Ser. No. 328,728
11 Claims. (Cl. 73—434)

This invention relates to density meters and, more particularly, to density meters of the type which continuously measure and record the density of a fluid while it is flowing through the meter.

In many industrial processes it is necessary to measure continuously the density of flowing fluids, so that corrective action can be taken, if the density deviates from the desired value. In order to be able to control accurately the density of the fluid, the response of the meter to changes in density of the fluid must be rapid, and yet sensitive.

Density meters are used, for example, in the oil fields for measuring the density of fluids such as drilling fluids, cement slurries and fracturing fluids. In cementing or drilling operations, it is essential to have a continuous indication of the density of the fluid, as it is actually being used in a particular process. The meter therefore must be located at the well site, even though it may be subjected to the severe handling and abuse usually associated with the heavy equipment located around an oil well. Consequently, it is important that the density meter be sufficiently rugged to withstand such abuses in this environment, but that it be sufficiently sensitive to indicate slight changes in the density of the fluid, as it flows rapidly through the meter.

Accordingly, it is an object of this invention to provide a density meter which is sensitive and accurate, and yet is rugged in construction.

It is a further object of this invention to provide a density meter having a rapid and linear response.

It is another object of this invention to provide a density meter which is easily adjusted and calibrated.

These objects are accomplished in accordance with a preferred embodiment of the invention by a density meter comprising a U-shaped tube supported at its ends by a yoke which is mounted on flexural pivots and counterbalanced. Flexible couplings connect fixed inlet and outlet conduits to each end of the tube. The flexural pivots are mounted in a sleeve. To provide adjustment of the pivot axis, the pivot axis may be eccentric of the circumference of the sleeve. The position of the pivot axis then may be adjusted to intersect the central axis of the couplings, after the meter is assembled. A pneumatic balance system measures the restoring force required to balance the tube assembly, thereby producing a signal which is proportional to the density of the fluid in the conduit. The balance system includes a primary beam mounted on the yoke for swinging movement with the conduit. A secondary beam is mounted under the primary beam for swinging movement relative to the primary beam, but in substantially the same vertical plane.

The air nozzle of the balance system is positioned adjacent the end of the primary beam and a resilient flapper valve is mounted on the primary beam and extends across the nozzle. The separation between the valve and the nozzle may be adjusted to change the relative signal pressure. A bellows under the secondary beam urges the secondary beam upward with a force which is proportional to the separation between the flapper valve and the nozzle. The pneumatic balance system also includes an air relay for augmenting the signal pressure. The force of the bellows is transmitted between the secondary beam and the primary beam by a nut which is threaded on the primary beam, thereby permitting adjustment of the leverage exerted by the bellows and the span of movement of the primary beam. The span of swinging movement of the tube is limited by a bracket which engages a portion of the tube. A screw in the bracket may be tightened to clamp the tube against displacement while the meter is not in use.

This preferred embodiment is illustrated in the accompanying drawing in which:

FIG. 1 is a top plan view of the density meter of this invention, with the cover removed;

FIG. 2 is a cross sectional view of the density meter along the line 2—2 in FIG. 1;

FIG. 3 is an enlarged top plan view of a portion of the density meter, with the cover removed;

FIG. 4 is a cross sectional view of the density meter along the line 4—4 in FIG. 3;

FIG. 5 is an enlarged cross sectional view of the density meter along the line 5—5 in FIG. 1;

FIG. 6 is an enlarged cross sectional view of the yoke pivot mounting along the line 6—6 in FIG. 3; and FIG. 7 is a cross sectional view along the line 7—7 in FIG. 6.

Referring to FIGS. 1 and 2, the density meter is mounted in a case having a bottom 2, side walls 4, and end walls 6. A cover 8 extends across the side walls and end walls and is fastened to the end walls by screws.

A U-shaped tube 10 extends longitudinally of the base 2. As shown in FIGS. 1, 2 and 3, the ends of the tube 10 are secured between clamps 12 on the opposite ends of a yoke 14. The yoke 14 is supported for pivoting movement on brackets 16 extending upward from the base 2. A pair of bracket members 18 extend outwardly on each opposite side of the center of the yoke 14. Each of the brackets 16 extends between a pair of bracket members 18 and, as shown in FIGS. 6 and 7, a common longitudinal bore 20 extends through the brackets 16 and 18. The pivot assembly for each pair of bracket members 18 includes a cylindrical shell 22, which is mounted in the bracket 16 and cylindrical shells 24 mounted in the yoke brackets 18. The shells 22 and 24 have a common central axis and a pair of arcuate elements 26 and 28 extend through the interior of the shells 22 and 24. The element 26 is spaced radially from the interior surfaces of the shells 24, but an enlarged central portion of the shell 26 is rigidly secured to the interior surface of the shell 22. The element 28 has a greater thickness at its opposite ends and is rigidly secured to the interior walls of the shells 24, but is radially spaced from the interior surface of the shell 22. Flat spring elements 30 are mounted within the shells 24, each having its opposite ends secured to the arcuate elements 26 and 28 and extending substantially parallel to each other. Another flat spring element 32 is mounted within the shell 22, having its opposite ends secured between the arcuate elements 26 and 28, and extending substantially at right angles to the spring elements 30. The flat springs 30 and 32 provide a restoring force urging the brackets 16 and 17 toward a position where the springs are not flexed.

As shown in FIG. 6, the common axis of the internal bores of the shells 22 and 24 is offset from the central axis of the bore 20. Also, the axis of intersection of the planes of the spring elements 30 and 32, which is the pivot axis of the assembly, is offset from the central axis of the external surfaces of the shells 22 and 24 which are received in the bore 20, as shown in FIG. 6. Therefore, by rotating the shells 20 and 22 relative to the brackets 16 and 18, the position of the pivot axis may be adjusted vertically relative to the bracket 16. Each of the brackets 16 and 18 has a slot 34 at its outer end and a screw 36 clamps the sleeves 22 and 24 in their respective brackets 16 and 18.

An inlet conduit 38 is mounted in brackets 40 and 42 and extends through the end wall 6. An outer conduit 44 is mounted in brackets 46 and 48 and also extends through the end wall 6. The opposite ends of the tube 10 are connected to the respective conduits 38 and 44 by flexible couplings 50. In order to reduce to a minimum the frictional resistance in the couplings 50 to vertical swinging movement of the tube 10, the pivot axis of the yoke 14 should be adjusted vertically as described above to coincide with the central axis of the couplings 50, after the meter is assembled.

An air balance system provides a restoring force to balance the weight of the fluid flowing through the tube 10. A primary beam 52 is mounted in the yoke 14 on the opposite side of the pivot axis of the yoke from the tube clamps 12. An arm 54 extends upward from the base 2 and supports a secondary beam 56 for swinging movement about a pivot 58. The pivot 58 may be of the same type as shown in FIGS. 6 and 7, to minimize frictional resistance. A bellows 60 is mounted on the base 2 and supports the secondary beam 56. The portion of the primary beam 52 which overlies the secondary beam 56 is threaded and a bearing nut 62 on the threaded portion engages the secondary beam 56 to form a bearing between the primary and secondary beams. By turning the nut 62 to advance the nut relative to the pivot 58, the leverage between the bellows 60 and the nut 62 may be adjusted. This arrangement also provides an adjustment of the span of vertical movement of the tube 10.

Air for operation of the balance is supplied to the meter through a fitting 64 on the end wall 6 of the case. An air relay 66 is mounted on the base 2 and air is supplied from the fitting 64 to the relay 66 through a tube 68. The relay 66 may be a conventional relay, such as that disclosed in Edwards, No. 2,299,884. A nozzle 70 is mounted on the arm 54 and is connected by a conduit 72 with the relay 66. Air from the relay 66 flows out of the nozzle 70 and a flapper valve 74, which is mounted on the primary beam 52 extends across the nozzle 70 to partially restrict the flow of air out of the nozzle. The valve 74 is formed of a resilient material, such as a flat metal spring and is secured to the beam by a clamp 76. A stud is threaded through the end of the arm 52 to engage the valve 74 adjacent the nozzle 70. By turning the stud 78, the clearance between the end of the nozzle 70 and the valve 74 may be adjusted. The pressure in the tube 72 is reduced in proportion to the clearance between the end of the nozzle 70 and the flapper valve 74.

Air is supplied from the relay 66 to the interior of the bellows 60 through a tube 80. The internal structure of the relay 66 is such that a decrease in pressure in the conduit 72 causes an increase in pressure in the conduit 80, thereby causing the bellows 60 to expand and swing the secondary beam 56 upwardly. The movement of the secondary beam 56 is transmitted through the nut 62 to the primary beam 52 and the tube 10, so that the flapper valve 74 moves toward the end of the nozzle 70 and restores the pressure in the conduit 72. The air relay 66 has a passage communicating between the conduit 80 and an output conduit 82 which may be connected by a fitting 84 on the wall 6 of the case with a remote pressure responsive recorder.

The primary beam 52 and the tube 10 are counterbalanced by a weight 86 which is slidably mounted on a rod 88. One end of the rod 88 extends through the yoke 14 and is secured therein. The weight 86 is secured in position on the rod 88 by a set screw 90.

As shown in FIG. 5, resistance to rapid vertical movement of the tube 10 is provided by a dash pot 92 containing a viscous fluid. A plunger 94 is secured by a bracket 96 to the tube 10. The extent of vertical movement of the tube 10 is limited by a block 98 which is mounted on the end wall 6 of the case. The block 98 has a transverse slot 100 in position to receive a flange 102 on the end of the tube 10. The width of the slot 100 is substantially greater than the thickness of the flange 102, thereby permitting the tube 10 to swing in a limited vertical arc. The clearance between the flange 102 and the slot 100 may be adjusted by means of a stud 104 which extends into the slot. When the density meter is to be transported from one location to another, the tube 10 may be caged by turning the stud 104 into the block 98 until the flange 102 is clamped against the opposite side of the slot 100.

To facilitate calibrating the tube 10 on the pivots, a pair of spring loaded adjusters apply a balancing force to the yoke. Each of the adjusters include a post 106 which is threaded into the lower side of the yoke 14. A threaded mandrel 108 extends through an internally threaded sleeve 110 which is secured in an upright portion of the base 2. A spring 112 is fastened between the end of the mandrel 108 and the post 106 to urge the tube 10 to swing downward. The mandrel 108 may be rotated by knobs 114 mounted on the outside of the wall 6 and having extension rods 116 connecting with the end of the mandrel 108. The rods 116 are provided with transverse pins 118 which extend through longitudinal slots 120 in the mandrel 108. Accordingly, when the knob 114 is turned, the mandrel 108 is rotated relative to the sleeve 110 and is advanced by means of the threads on the mandrel. Longitudinal movement of the mandrel 108 changes the force exerted by the spring 112, thereby varying the force imposed by the spring on the yoke 14. One of the pair of adjusters may be used to adjust the range of the meter, by varying the air output at the recorder to correspond to the actual density reading of the fluid flowing in the tube 10. The other adjuster may be used for fine adjustment or for zeroing the meter.

After the density meter is initially assembled, the central axis of the couplings 50 may not coincide with the pivot axis of the resilient metal springs 30 and 32 which support the yoke 14. The internal resistance to bending of the couplings, however, is minimized when the pivot intersects the central axis of the couplings. If it is found that after the meter is assembled, the central axes of the couplings 50 are above or below the pivot axis of the metal strips 30 and 32, the screw 36, as shown in FIG. 6, may be loosened and the shell 22 rotated to raise or lower the pivot axis until it coincides with the central axis of the couplings. The screw 36 and corresponding screws on the brackets 18 are then tightened.

To operate the density meter, the fitting 64 is connected to a supply of air under pressure. Conduits for conducting fluid into and out of the density meter are connected to the tubes 38 and 44, respectively. A conventional pneumatic recording instrument may be connected to the fitting 84 to record the pressure signals from the relay 66. The stud 104 in the block 98 is loosened and the springs 112 are adjusted by the knobs 114 to provide sufficient air output pressure to operate the recording instrument. Also, by adjusting the springs 112, the recording instrument may be calibrated directly to show the density of the fluid flowing through the tube 10. The threaded nut 62 may be adjusted along the length of the primary beam 52 to change the leverage between the nut 62 and the bellows 60, thereby changing the range and sensitivity of the meter. The clearance between the end of the nozzle 70 and the flapper valve 74, when the arm 50 is in a neutral position, may be adjusted by means of the screw 78 to limit the pressure drop through the nozzle 70. After the density measurements have been completed, the stud 104 may be tightened to lock the tube 10 in position, so that the instrument may be safely transported from one location to another.

The internal friction in a density meter causes errors in the density readings, a slow response in recording the density of the fluid and hysteresis type errors in recording rapid changes in density. By providing a means for adjusting the pivot axis of the yoke 14 to coincide with the central axis of the couplings 50, the internal friction of the couplings is minimized. Furthermore, the knife-edged nut 62 of the force arm bears on the secondary beam 56 substantially at their respective center lines, so that relative motion between the secondary beam and the nut 62 is substantially eliminated.

Although the response of the meter is relatively rapid, if the density of the fluid should suddenly decrease, there is a danger that the tube 10 will rise and the flapper valve 74 will damage the nozzle 70. This problem is overcome in this invention by providing a resilient flapper valve, so that it is easily deflected when it engages the nozzle 70, but its position is normally fixed by the screw 78.

Furthermore, the use of an air relay as part of the null balance system provides substantially greater output linearity and increases the response time of the instrument. This is particularly important where long transmission lines are required between the meter and the recording instrument.

While this invention has been illustrated and described in one embodiment, it is recognized that variations and changes may be made therein without departing from the invention as set forth in the claims.

I claim:

1. Fluid density measuring apparatus comprising a base; fixed inlet and outlet fluid carrying conduits on the base; a weighing beam including a counterbalanced, looped, fluid carrying tube; flexible fluid carrying couplings connecting said inlet and outlet conduits to said looped tube; means mounting the looped tube for pivoting movement relative to said inlet and outlet conduits; said mounting means including a plurality of flat springs, said springs being arranged to form a common pivot axis, first housing means securing together one end of each spring, second housing means securing together the opposite end of each spring, said first and second housing means including a common cylindrical outer surface, said surface having a central axis parallel to and spaced from said pivot axis, means for mounting said first housing means on said base and said second housing means on said tube; an air nozzle, means for conducting air to said nozzle, valve means on said mounting means and extending across said nozzle, air actuated means for pivoting said conduit in response to the position of said valve relative to said nozzle, and means for transmitting an air pressure signal from said nozzle whereby the pressure signal which is proportional to the fluid density may be recorded.

2. Fluid density measuring apparatus comprising a base; fixed inlet and outlet fluid carrying conduits on the base, a weighing beam including a counterbalanced, looped, fluid carrying tube and a yoke connected across the loop of said tube, flexible fluid carrying couplings connecting said inlet and outlet conduits to said looped tube, a unitary flexural pivot device including a plurality of flat springs and a pair of housing members having a central axis, said springs being secured at opposite ends in each of said housing members, one of said springs being angularly offset from another of said springs and defining a pivot axis transversely of said springs, said pivot axis being substantially parallel to and spaced from said housing members central axis, and means for mounting one of said housing members on said yoke and the other housing member on said base, whereby the pivot axis of said tube may be adjusted with respect to the central axis of said couplings.

3. Fluid density measuring apparatus as defined by claim 2 wherein said housing members each have a substantially cylindrical outer surface, said surface of each member being substantially concentric with said central axis.

4. Fluid density measuring apparatus as defined by claim 3 wherein said base includes a rigid support member, said yoke and said base member each having a bore therein, said yoke bore and said base member bore being in substantial alignment, and means for clamping one of said housing members in said base member bore and the other of said housing members in said yoke bore.

5. Fluid density measuring apparatus comprising a base; fixed inlet and outlet fluid carrying conduits on the base; a weighing beam having a counterbalanced, looped, fluid carrying tube and a yoke connected across the loop of said tube; flexible fluid carrying couplings connecting said inlet and outlet conduits to said looped tube; means mounting the yoke for pivoting movement relative to said inlet and outlet conduits; a primary beam secured in said yoke and extending between the looped ends of the tube; a secondary beam; means mounting one end of the secondary beam on the base adjacent the primary beam for vertical swinging movement relative thereto; bearing means between the primary beam and secondary beam; a bellows supporting the opposite end of the secondary beam; an air nozzle; means for conducting air to the nozzle; a resilient valve member extending outwardly from the end of said primary beam and across said nozzle; an air relay interconnecting said nozzle and said bellows; and means for transmitting an air pressure signal from said air relay.

6. Fluid density measuring apparatus as defined in claim 5, including means on the primary beam for adjusting the separation between the nozzle and the resilient valve member.

7. Fluid density measuring apparatus as defined by claim 5 including means for selectively locking said tube to said base, whereby the tube and beams remain fixed while transporting the apparatus.

8. Fluid density measuring apparatus comprising a base; fixed inlet and outlet fluid carrying conduits on the base; a weighing beam having a counterbalanced, looped, fluid carrying tube and a yoke connected across the loop of said tube; flexible fluid carrying couplings connecting said inlet and outlet conduits to said looped tube; means mounting the yoke for pivoting movement relative to said inlet and outlet conduits; a primary beam secured in said yoke and extending between the looped ends of the tube; a secondary beam; means mounting one end of the secondary beam on the base adjacent the primary beam for vertical swinging movement relative thereto; bearing means between the primary beam and secondary beam; means for displacing said bearing means longitudinally relative to said primary beam and secondary beam for adjusting the span of vertical displacement of the primary beam; a bellows supporting the opposite end of the secondary beam; an air nozzle. means for conducting air to the nozzle; a resilient valve member extending outwardly from the end of said primary beam and across said nozzle; an air relay interconnecting said nozzle and said bellows; and means for transmitting an air pressure signal from said air relay.

9. Fluid density measuring apparatus comprising a base; fixed inlet and outlet fluid carrying conduits on the base; a weighing beam having a counterbalanced, looped fluid carrying tube and a yoke connected across the loop of said tube; flexible fluid carrying couplings connecting said inlet and outlet conduits to said looped tube; a hollow shell mounted on said yoke; said shell having a longitudinal bore therein extending transversely of said inlet and outlet conduits; a pair of hollow shells on opposite sides of said yoke shell; said pair of shells being fixedly mounted on said base and having longitudinal bores therein with central axes coinciding with the axis of said yoke shell bore; a pair of arcuate elements extending through said shells; one of said arcuate elements being secured at opposite ends to each of said fixed shells; the other of said arcuate elements being secured to said yoke shells; a plurality of flat spring elements extending between said arcuate elements; at least one of the spring elements being positioned substantially at right angles to at least one other spring element, thereby forming a pivot axis on a line defined by intersecting planes of said spring elements and substantially intersecting the central axis of said couplings; said first axis being eccentric of the outer surface of said shells; a primary beam secured to said yoke and extending between the looped ends of the tube; a secondary beam; means mounting one end of the secondary beam on the base adjacent the primary beam for vertical swinging movement relative thereto; said primary beam having a threaded portion thereon; a nut threaded on said primary beam in engagement with the secondary beam and forming a bearing therebetween; an air nozzle adjacent the primary beam; means for conducting air to the nozzle; a resilient valve member mounted on the primary beam and extending outwardly therefrom and across said nozzle; a bellows supporting the opposite end of the secondary beam; an air relay interconnecting said nozzle and said bellows; means for transmitting an air pressure signal from said air relay; and means for adjusting the balance of said yoke and tube.

10. Fluid density measuring apparatus comprising a base; fixed inlet and outlet fluid carrying conduits on the base; a weighing beam including a counterbalanced, looped, fluid carrying tube; flexible fluid carrying couplings connecting said inlet and outlet conduits to said looped tube; means mounting the looped tube for pivoting movement relative to said inlet and outlet conduits; said tube mounting means including at least two flat spring elements extending substantially at right angles to each other and defining a pivot axis, means for rotating said flat springs about an axis substantially parallel to said pivot axis but spaced from said pivot axis, an air nozzle, means for conducting air to said nozzle, valve means on said mounting means and extending across said nozzle, air actuated means for pivoting said conduit in response to the position of said valve relative to said nozzle, and means for transmitting an air pressure signal from said nozzle whereby the pressure signal which is proportional to the fluid density may be recorded.

11. A flexural pivot device comprising a plurality of shells each having a longitudinal bore therein, a pair of arcuate elements extending longitudinally through said shells, the longitudinal bores of said shells having a common axis, one of said arcuate elements being secured to one of said shells, the other of said arcuate elements being secured to another of said shells, a plurality of flat spring elements extending between said arcuate elements, at least one of the spring elements being positioned at right angles to at least one other spring element, thereby forming a pivot axis on a line formed by intersecting planes of said spring elements, said shells having a cylindrical outer surface, the central axis of said shells outer surface being spaced from said pivot axis and being substantially parallel to said pivot axis whereby the pivot axis may be adjusted by rotating the shells about the central axis when the shells are assembled in a mounting.

References Cited by the Examiner

UNITED STATES PATENTS

| 2,989,063 | 6/1961 | Clark | 137—85 |
| 3,039,310 | 6/1962 | Copland et al. | 73—434 |
| 3,044,302 | 7/1962 | Knauth | 73—434 |
| 3,142,888 | 8/1964 | Troeger | 308—2 X |
| 3,187,584 | 6/1965 | Hudson | 73—434 |

OTHER REFERENCES

Article: "Measures Specific Gravity on the Run," in Product Engineering, June 12, 1961, p. 67.

Withers: R.M.J. Instrumentation in the British Sugar Corporation—2; in Instrument Practice, March 1960, p. 250.

RICHARD C. QUEISSER, *Primary Examiner.*

DAVID SCHONBERG, *Examiner.*

J. W. MYRACLE, *Assistant Examiner.*